(12) United States Patent
Vetrano

(10) Patent No.: US 6,402,856 B1
(45) Date of Patent: Jun. 11, 2002

(54) METHOD AND APPARATUS FOR STRIPPING AN OPTICAL FIBER

(75) Inventor: Carmine J. Vetrano, Medford, MA (US)

(73) Assignee: 3SAE Technologies, Inc., Woburn, MA (US)

( * ) Notice: Subject to any disclaimer, the term of this patent is extended or adjusted under 35 U.S.C. 154(b) by 0 days.

(21) Appl. No.: 09/977,107

(22) Filed: Oct. 12, 2001

Related U.S. Application Data

(63) Continuation-in-part of application No. 09/724,001, filed on Nov. 28, 2000, now abandoned.
(60) Provisional application No. 60/306,843, filed on Jul. 20, 2001, provisional application No. 60/307,297, filed on Jul. 23, 2001, and provisional application No. 60/310,172, filed on Aug. 3, 2001.

(51) Int. Cl.$^7$ .............................................. G08B 5/00
(52) U.S. Cl. ........................... 134/19; 134/31; 134/34; 134/35; 134/37; 134/42; 34/60; 34/380
(58) Field of Search ............... 134/19, 31, 34, 134/35, 37, 42; 34/380, 60

(56) References Cited

U.S. PATENT DOCUMENTS

| | | | | |
|---|---|---|---|---|
| 4,028,080 A | * | 6/1977 | Di Vita et al. ................. 134/1 |
| 5,125,980 A | * | 6/1992 | Schotter ....................... 134/15 |
| 5,526,833 A | * | 6/1996 | Crespel et al. ............ 134/102.1 |
| 5,922,141 A | * | 7/1999 | Darsey ......................... 134/15 |
| 5,939,136 A | * | 8/1999 | Cronk et al. ................ 264/1.24 |
| 5,954,974 A | * | 9/1999 | Broer et al. .................... 216/2 |
| 5,964,957 A | * | 10/1999 | Walraven et al. ............. 134/19 |
| 5,968,283 A | * | 10/1999 | Walraven et al. ............. 134/19 |
| 6,052,880 A | * | 4/2000 | Basavanhally .............. 29/33.5 |

* cited by examiner

Primary Examiner—Sharidan Carrillo
(74) Attorney, Agent, or Firm—McDermott, Will & Emery

(57) ABSTRACT

A system for stripping an optical fiber includes a source air, and means for generating very short bursts of air. A heater heats the bursts of air to a temperature sufficient to remove the outer coating from an optical fiber, while maintaining the air isolated from the heat source. The heater includes a heater core that includes a heat generating element such as a conductive filament, and a heat chamber enclosed within the heater core. A spiral-shaped air conduit surrounds the outer surface of the heater core, and communicates with the heat chamber. Upon injection of air into the conduit, heat is transferred to the air from the heat generating element while the air flows through the air conduit and into and out of the chamber. A single burst of heated air removes the outer coating of an optical fiber, within less than one second.

17 Claims, 7 Drawing Sheets

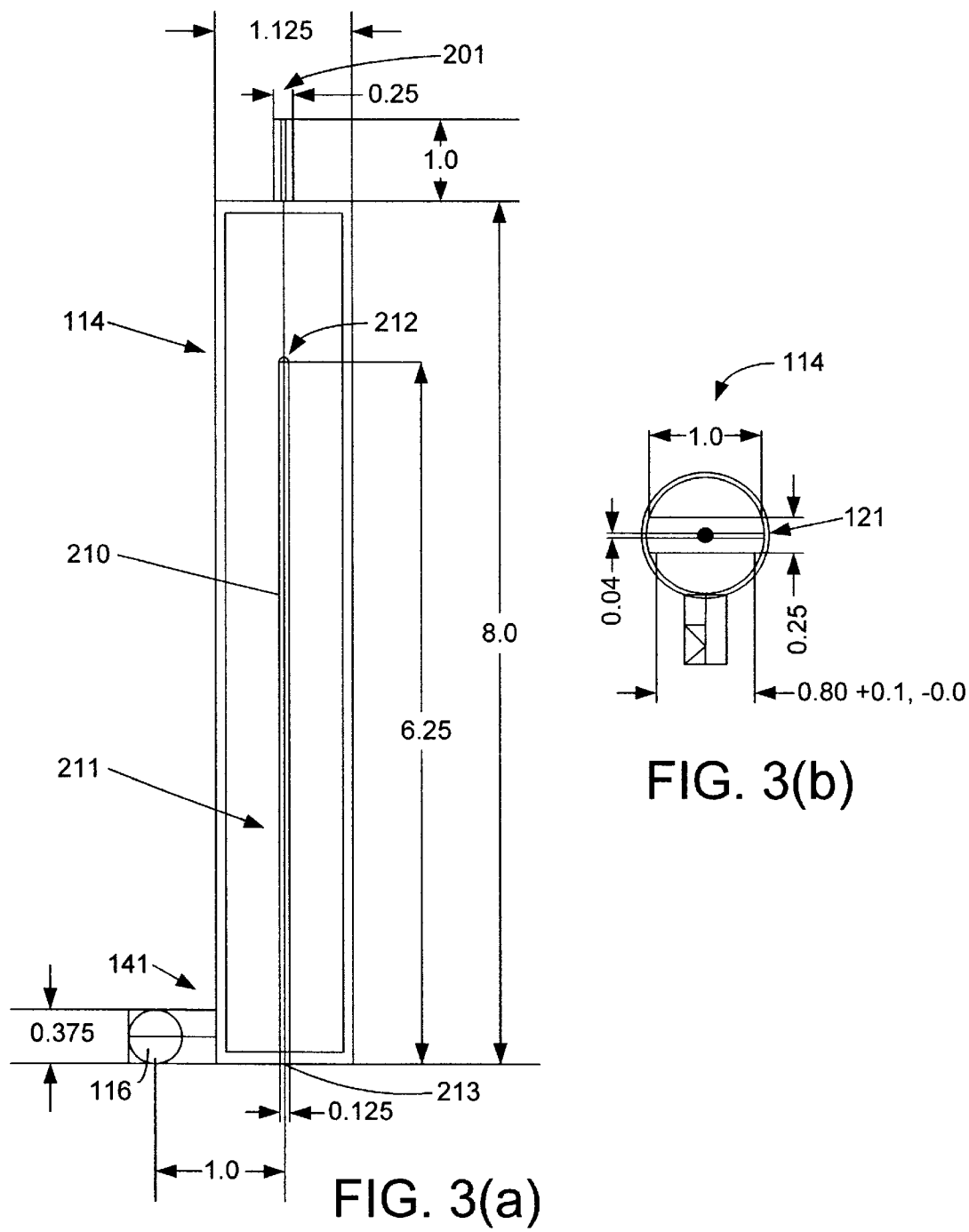

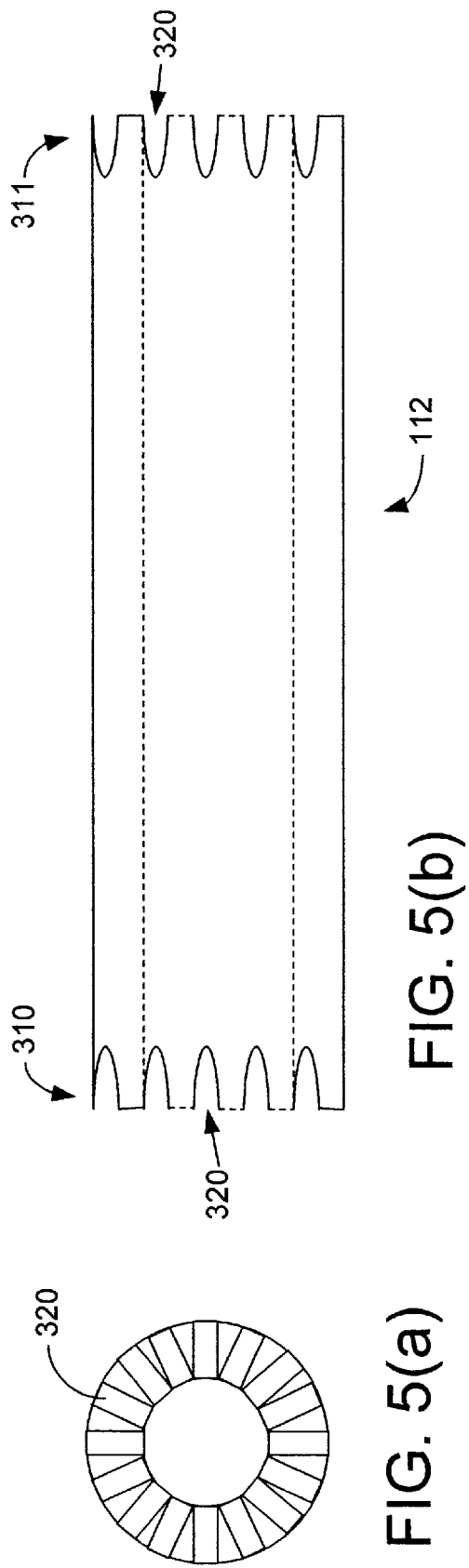

METHOD AND APPARATUS FOR STRIPPING AN OPTICAL FIBER

CROSS-REFERENCE TO RELATED APPLICATIONS

This application is a continuation-in-part of U.S. application Ser. No. 09/724,001, filed on Nov. 28, 2000 (now abandoned), and claims benefit of priority from U.S. Provisional Application Serial No. 60/306,843, filed on Jul. 20, 2001, U.S. Provisional Application Serial No. 60/307,297, filed on Jul. 23, 2001, and U.S. Provisional Application Serial No. 60/310,172, filed on Aug. 3, 2001.

STATEMENT REGARDING FEDERALLY SPONSORED RESEARCH

Not applicable

REFERENCE TO MICROFICHE APPENDIX

Not applicable

FIELD OF THE INVENTION

This invention relates generally to stripping optical fibers, and in particular to a method and apparatus for rapidly and efficiently stripping optical fibers without using chemicals and without reducing the tensile strength of the fiber.

BACKGROUND OF THE INVENTION

Fiber optic cables are widely used in modem optical devices and optical communications systems. Optical fibers are usually coated with a protective layer, for example a polymer coating, in order to protect the surface of the fiber from chemical or mechanical damage. It is necessary to remove the protective coating in order to prepare the fibers to be cleaved and spliced, or in order to further process the fibers to manufacture optical devices such as optical sensors and other optical communications network components.

Conventional stripping methods include mechanical stripping, chemical stripping, and thermal stripping. These methods all suffer from a number of defects. Mechanical stripping typically involves a stripping tool, similar to a wire stripper, which cuts through the coating and scrapes it off. A major disadvantage is that mechanical stripping typically nicks or scratches the glass fiber surface, eventually leading to cracks and to a degradation in the tensile strength of the fiber. By way of example, the tensile strength of an optical fiber may be reduced from about 15–16 pounds before mechanical stripping to about 3–5 pounds after mechanical stripping. The optical fiber's longevity is thereby reduced.

Chemical stripping uses solvents or concentrated acids to remove the polymer coating. In the prior art, acid stripping is often performed using a sulfuric nitric mixture that includes about 95% sulfuric acid and about 5% nitric acid. While this prior art method reduces tensile strength degradation, an acid residue may typically be left on the fiber surface at the splice point. Therefore, using chemical stripping on titanium dioxide color coded fiber degrades the splice strength. Also, chemical stripping as performed in the prior art is very costly. Finally, there are major safety concerns inherent in chemical stripping methods. Ventilation and safety equipment may be needed when using acids for the stripping process. Human operators performing acid stripping require facilities having well-ventilated areas, preferably with exhaust or ventilation hoods for removing acid fumes. They may also require protective gear, such as protective clothing and gloves, for avoiding acid burns, and protective breathing apparatus for protection from acid fumes in the air. Storing, handling, and transporting the acids are also extremely hazardous.

Thermal stripping processes use heat to remove the coating. In particular, hot air stripping methods have been used in the prior art, in which heat is applied to the polymer coating, causing the polymer coating to heat to a break temperature, expand, burst, and detach itself from the underlying optical fiber. Prior art hot air stripping methods, such as disclosed for example in U.S. Pat. No. 5,968,283, involve translation of the fiber optical cable. The fiber optical cable is moved over the heat source so that heat is applied along the optical fiber cable between selected points, causing the corresponding polymer coating to curl and drop off the optical fiber. One prior art method applies a 470 degree hot air starting at one point on the fiber optic cable, and then moves the heat along the fiber, causing the polymer coating to curl.

These hot air stripping methods suffer from a number of disadvantages. The use of translation of the fiber optical cable is costly and inefficient. Also, polymer coating curls can remain attached to the fiber optical cable. To prevent the polymer coatings from remaining attached to the optical fiber, it may be necessary to split the polymer coating from the optical fiber at two points, before attempting to curl a section of the polymer coating off the optical fiber. Finally, these prior art methods may expose the air stream to carbon or oxidizing metals from the heat source, so that particles of carbon or oxidizing metals are deposited on the fiber. When such unwanted particles are deposited on the fiber, the tensile strength of the fiber may be reduced over time.

Another disadvantage of methods such as the method disclosed in U.S. Pat. No. 5,968,283 is that these methods use a hot air heat source that must generate heat at the break temperature, before starting to heat the polymer coating. This usually requires a flow of hot air for a period of time, before each stripping process begins. Devices such as heat shrink guns rated at 1500 Watts, which generate forced air. at a temperature of about 470 degrees Celsius, are thus used as the heat source in these prior art methods. When splicing cycles are repeated, the flow of very hot air may be continuous. A continuous flow of very hot air can make it extremely hot and dangerous for the operator.

It is an object of this invention to provide a method and apparatus for stripping fiber optical cable that do not suffer from the disadvantages described above. In particular, it is an object of this invention to provide a method and apparatus for stripping fiber optical cable without using chemicals, and without reducing the tensile strength of the fiber. It is another object of this invention to provide a method and apparatus for stripping fiber without translating either the optical fiber or the heat source, and without curling the polymer coating. It is another object of this invention to provide a method and apparatus for stripping fiber more rapidly and efficiently, as compared to prior art methods, and without leaving any coating residues on the fiber. It is yet another object of this invention to provide a method and apparatus for stripping fiber that can be used to strip titanium dioxide color coded fiber, without degrading the splice strength of the fiber. It is yet another object of the present invention to provide and method and apparatus for stripping optical fiber that does not require a continuous flow of hot air.

SUMMARY OF THE INVENTION

The present invention provides a system and method for heat stripping an optical fiber. A short, heated burst of air is injected from a forced air heat source, and applied along the stripping length of the optical fiber. The burst of air lasts less: than one second, and has a temperature of about 700–1100 degrees C.; The outer coating of the optical fiber vaporizes very rapidly, without requiring any motion of the fiber or the heat source. The outer coating of the optical fiber is removed without degrading the original tensile strength of the fiber. No coating residue remains on the fiber, and no curling of the coating occurs. While heated air is used in a preferred embodiment of the invention, other embodiments may use other substances, such as other gases and fluids.

A system for stripping an optical fiber in accordance with the present invention includes a source of air, and means for generating short bursts or streams of air from the air source, by releasing compressed air from the air source during short periods of time. Typically, each air stream lasts less than one second. In one embodiment of the invention, the means for generating air streams includes an air pressure generator for creating air pressure, an air pressure controller for controlling air pressure, and an air flow regulator for regulating the flow of air out of the air source so as to controllably release compressed air from the air source during very short time intervals. In one form of the invention, the air flow regulator may be a solenoid valve controlled by a timer circuit.

The optical fiber stripping system further includes a heater for heating the short air streams to a temperature sufficient to remove the outer coating from the optical fiber. Typically, the requisite temperature is from about 700 degrees Celsius to about 1100 degrees Celsius. The heater heats the air streams without bringing the air streams into contact with the heat source in the heater. In this way, the air streams avoid exposure to unwanted contaminating particles from the heat source, such as carbon or oxidized particles. The unwanted particles are thus prevented from depositing themselves on the fiber, and from reducing the tensile strength of the fiber over time. The heater can be used to efficiently heat substances other than air, such as other gases and fluids.

The heater includes a heater core having a heat generating element. The heater core encloses an inner heat chamber. A spiral-shaped air conduit surrounds the outer surface of the heater core, and is in communication with the heat chamber. When an air stream is injected from the air source into the air conduit, heat generated by the heat generating element in the heater core is transferred to the air stream while the air stream flows through the conduit and through the heat chamber. In this way, the air stream is heated to a temperature sufficient to strip an optical fiber, while remaining isolated from the heat generating element in the heater core. An air outlet nozzle connected to an outlet port of the heat chamber directs the heated burst of air along the stripping length of an optical fiber. The outer coating of the fiber is vaporized and removed almost instantly.

The present invention features a method for stripping an optical fiber. The method includes generating a plurality of air streams, each characterized by a relatively short duration in time. The air streams are,injected into a heater having a heat generating element. The air streams are heated to a temperature sufficient to vaporize the outer coating from the fiber, without being exposed to the heat generating element. A single air stream is directed along the entire stripping length of an optical fiber, so as to thermally remove the outer coating from the optical fiber within less than one second.

BRIEF DESCRIPTION OF THE DRAWINGS

The invention can be more fully understood by referring to the following detailed description taken in conjunction with the accompanying drawings, in which:

FIG. 3(a) provides a side view of the inner heat chamber.

FIG. 3(b) provides a top view of the inner heat chamber.

FIG. 5(a) provides a top view of a heater core, constructed in accordance with a preferred embodiment of the present invention.

FIG. 5(b) provides a side view of a heater core, constructed in accordance with a preferred embodiment of the present invention.

DETAILED DESCRIPTION

The present invention provides a system and method for ultra-fast stripping of the outer coating from an optical fiber, without using chemicals and without reducing the original tensile strength of the fiber. The heating efficiency is significantly improved, as compared to the prior art.

Figure 1:
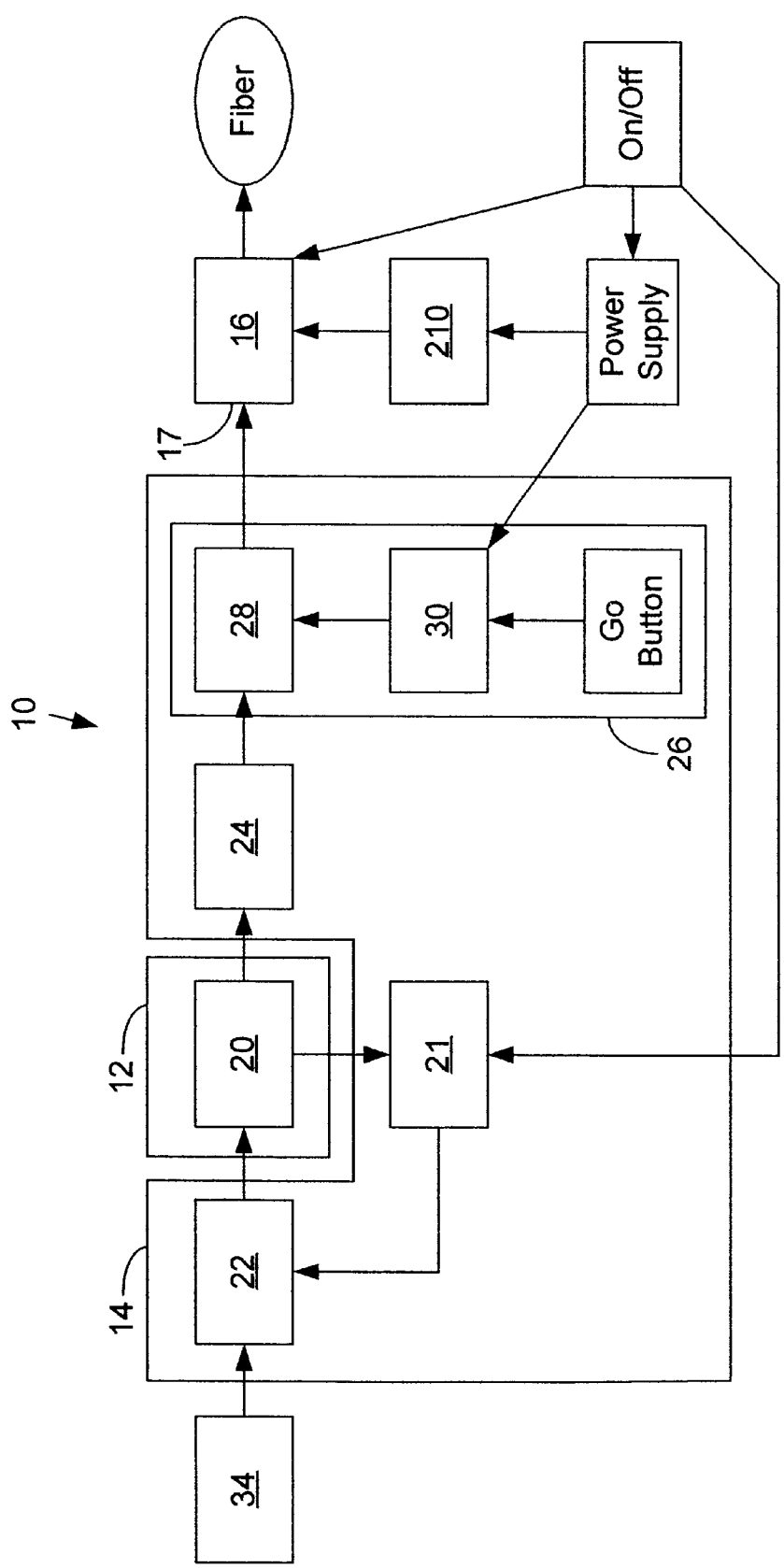
FIG. 1 provides a schematic block diagram of a system for stripping an optical fiber, constructed in accordance with the present invention.

FIG. 1 provides a schematic block diagram of a system 10 for stripping a fiber optic cable, constructed in accordance with one embodiment of the present invention. In overview, the system 10 includes a source of air 12, and means 14 for generating very short bursts of air, or air streams, from the air source. While air is used in the embodiment illustrated in FIG. 1, other substances can be used, including but not limited to gases and fluids. The system further includes a heater 16 for rapidly heating the bursts of air from the air source to a temperature sufficient to remove the outer coating from an optical fiber. The heater 16 can be used to heat substances other than air, such as other gases and fluids.

In one embodiment of the invention, the air source 12 is a pressure vessel 20 that contains air. Preferably, an air filter 34 is used to filter the air before the air enters the pressure vessel 20. In this way, the air source 12 provides air that is free of contaminants, such as oil or oxidized particles. A desiccant may also be added to the air.

In one embodiment, the means 14 for generating short air streams includes a pressure pump 22, an air pressure controller 24, and an air flow regulator 26. The pressure pump 22 creates a pressure buildup in the pressure vessel 20. The air pressure controller 24 controls the air pressure created by the pressure pump 22 within the vessel 20, and also controls. the air pressure that leaves the pressure vessel 20. A pressure switch 28 can be used with the air pressure controller 24, in order to limit and maintain the pressure in the pressure vessel 20.

The air flow regulator 26 is responsive to the air pressure controller 24, and regulates the flow of compressed air out of the air source, so as to release compressed air at desired times to create short bursts of air. The air flow regulator 26 may include a solenoid valve 28, which can be used to release the air pressure form the pressure vessel 20 for very short time intervals, creating the burst effect. An adjustable timer circuit 30, preferably including an embedded microprocessor, can be used to control the on/off switching of the solenoid valve, and thereby control the duration of the burst. The burst of air released from the pressure vessel 20 is injected into an input port 34 of the heater 16. A power supply can be provided to supply power for the heater and the timer circuit, and an on/off switch may regulate the heater 16, the pressure controller 24, and the pressure regulator 26.

Figure 2:
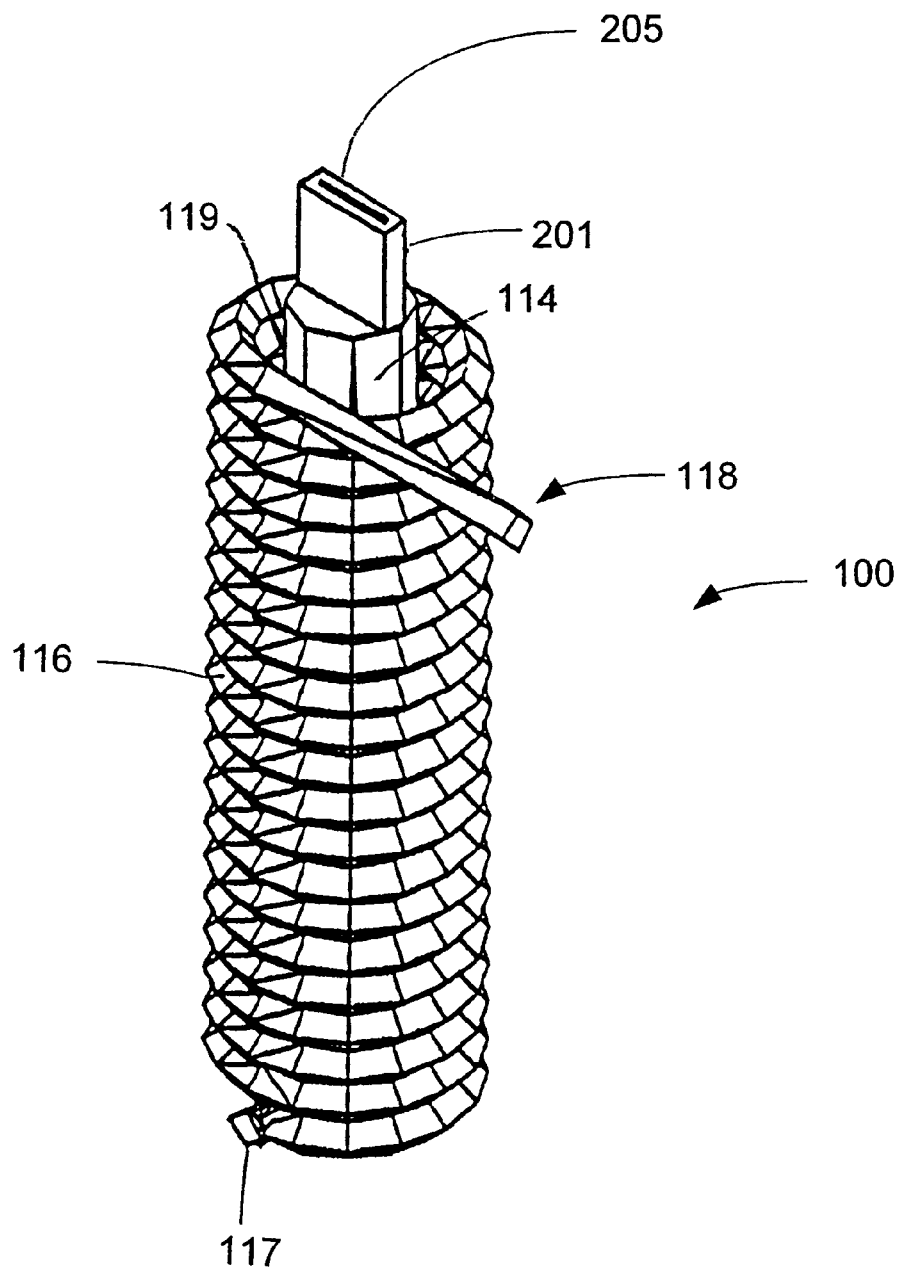
FIG. 2 provides an overall plan view of a heater constructed in accordance with the present invention.

FIG. 2 provides an overall plan view of a heater 100 constructed in accordance with one embodiment of the present invention. In a preferred embodiment, the heater 100 is a process air heater that can achieve the extremely high air temperatures required to strip optical fiber, typically between about 700 degrees Celsius to about 1100 degrees Celsius. The heater 100 provides a unique combination of low cost, high efficiency, small size, purity, and maximum temperature. The heater 100 is designed so as to enclose most of the heat within an inner heat chamber 114, until heated air is released from an outlet port of the heat chamber 114. Preferably, the heater 100 has less than 10 minutes of ramp time, from room temperature to the desired temperature. The heater 100 is capable of achieving and maintaining air temperatures in excess of 1050 degrees Celsius, for long periods of time. The power requirement for the heater 100 is preferably a maximum of about 500 watts, at 120 volts AC. In the illustrated embodiment, the heater 100 is about 10 inches long, and 4 inches in diameter.

Effective stripping of optical fiber requires that the process air heater 100 not introduce contamination of any kind in to the air stream. If introduced into the air stream, the contaminating particles would deposit themselves onto the optical fiber, when the heated air streams are applied to the stripping length of the optical fiber. This would eventually lead to degradation of the splice strength of the fiber.

In the present invention, the heater 100 utilizes a heat exchanger. The heat exchanger enables the heater to heat the bursts of air to the desired high temperatures, while preventing exposure of the air to any unwanted particles from the heat generating element in the heater, such as oxidized metal particles or carbon. The heat exchanger is designed to maximize convection, conduction, and radiation. The use of a heat exchanger, together with the air filter 34 described in conjunction with FIG. 1, prevents oxidized or otherwise contaminated heater particles from coming into contact with the fiber. This is one of the reasons why the method and system of the present invention yield substantially higher and more consistent tensile strength of the stripped fiber, as compared to prior art methods.

In a preferred embodiment, the heat exchanger includes a heater core 112 (further illustrated in FIG. 5), an inner heat chamber 114, and an air conduit 116 surrounding the heater core 112. In one embodiment, the heater core 112 may be a replaceable component of the heater 100. By using a replaceable heater core, the cost and frequency of replacing a burned out heater can be minimized, and the heater can have a lifespan of at least 5000+ hours. The heater core 112 preferably has a cylindrical shell structure, and includes a heat generating element 113. In a preferred embodiment, the heat generating element 113 is a conductive filament, such as a heater wire, that generates heat when an electrical potential is applied across the filament. The heat chamber 114 is disposed within the heater core 112.

The air conduit 116 is preferably spiral-shaped, and encircles the outer surface of the heater core 112. A gap or void region 119 is thus formed between the inner chamber 114 and the outer spiral conduit 116. The gap region 119 is also shaped as a cylindrical shell, and is sized so as to allow the heater core 112 to be easily press-fit into the gap region. In a configuration in which a replaceable heater core is used, the gap region 119 allows the replaceable heater core to be easily inserted therein and removed therefrom.

The air conduit 116 communicates with the heat chamber 114 at one end 117 of the conduit 116. The conduit 116 includes an input end 118 into which bursts of air from the air source 12 are injected, for example using an air injection nozzle. Upon injection of an air stream into the air conduit 116, heat from the heat generating element 113 in the heater core 112 is transferred to the injected air while the air flows through the air conduit 116 and into the heat chamber 114. In this way, the air stream is heated to the high temperatures necessary for stripping fiber optic cable, while avoiding any contact with the heat generating element 113 and the heater core 112.

The heat chamber 114 serves to enclose within the chamber most of the heat generated by the heat generating element 113 in the heater core 112, until a heated air stream is released from the chamber. An air outlet nozzle 205, connected to the outlet port 201, is used to direct a heated air stream from the heat chamber 114 to the optical fiber to be stripped. In contrast to prior art methods, in which a continuous flow of hot air is generated in order to strip an optical fiber, in the present invention the heat is enclosed in the chamber 114, until a single, short burst of hot air is generated at approximately 700 to 1100 degrees C. The heated air stream is directed along the length of the fiber coating to be stripped, and lasts less than 1 second. The entire polymer coating to be stripped is vaporized almost instantly. Also, there is no ramp up time or flow of hot air between cycles.

FIG. 3(a) provides a side view of one embodiment of the inner heat chamber 114. In the illustrated embodiment, the heat chamber 114 has an outer diameter of about 1.125 inches, and a length of about 8.0 inches. The heat chamber 114 includes an outlet port 201 for allowing the heated air stream to exit from the chamber 114. The heat chamber 114 is preferably welded to the air conduit 116 at a bottom end 141 of the chamber 114. The heat chamber 114 causes the air flowing through the heater to slow down, compared to the rate at which the air flowed through the air conduit 116. This allows more heat to be absorbed into the process air.

In a preferred embodiment, the heat chamber 114 encloses a temperature controller 210, which provides measurement and feedback control of the temperature inside the heat chamber 114. Preferably, the temperature controller is a thermocouple 210 that is inserted into a small-diameter capillary tube 211. The small diameter tube 211 is closed at a first end 212, and is open at a second end 213 in order to allow for insertion of the thermocouple. The thermocouple 210 allows accurate measurement of the process air temperature, without adding contamination during the measurement process.

FIG. 3(b) illustrates the dimensions of the heat chamber 114, as viewed from the top. In the illustrated embodiment, the inner diameter of the heat chamber 114 is about 1.0". The hot air output nozzle 121 is shown as having a diameter of about 0.25".

Figure 4A:
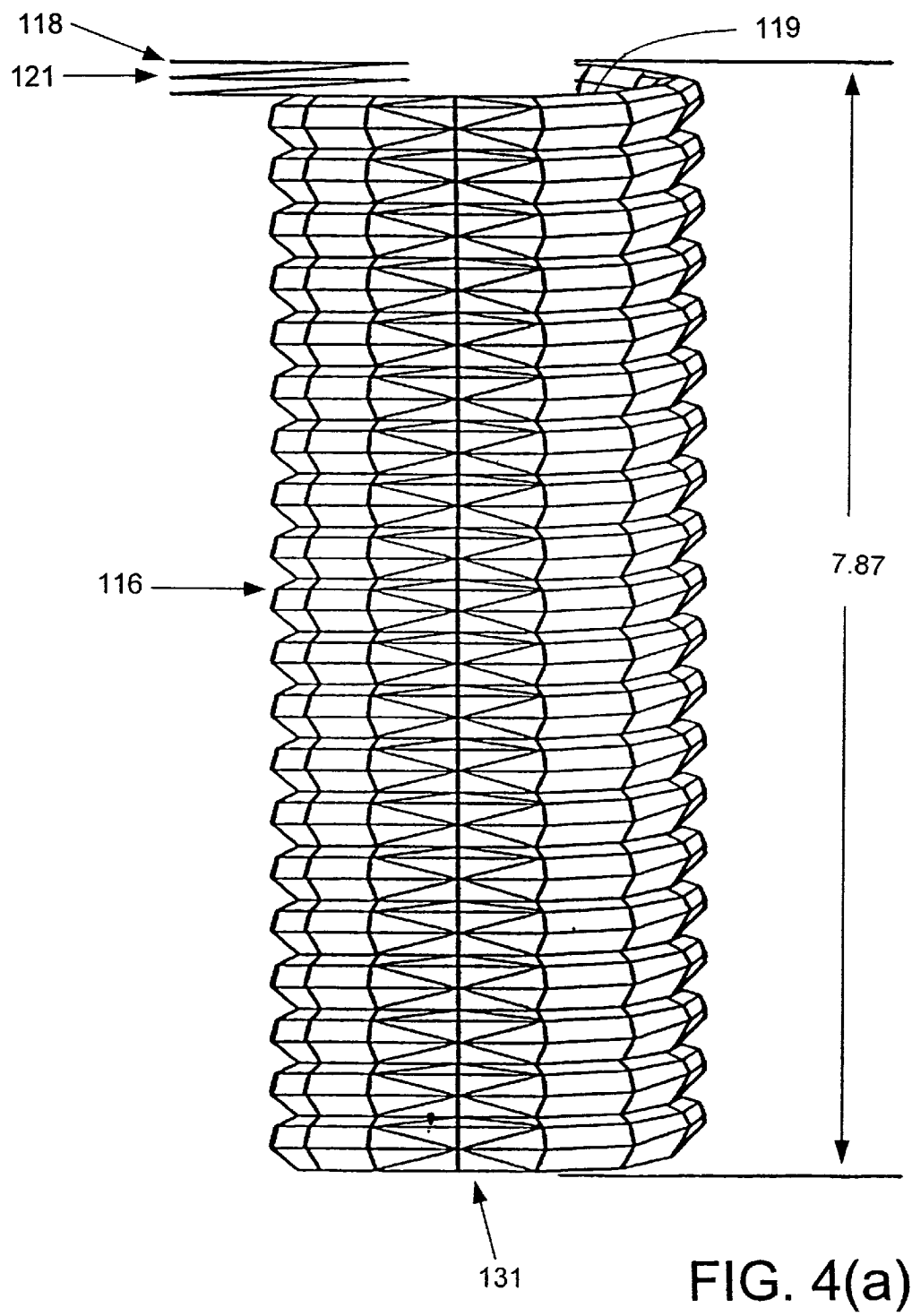
FIG. 4(a) provides a side view of the spiral-shaped air conduit that surrounds the heater core.

FIG. 4(a) provides a side view of one embodiment of the spiral-shaped air conduit that surrounds the heater core. The spiral shaped conduit 116 is also preferably made of quartz. Preferably, the spiral-shaped air conduit 116 forms a helical coil defining a plurality of turns. The outer surface of the heat chamber 114 and the inner surface of the helical coil define the gap region 119, which is shaped as a tube-shell so as to allow the heater core 112 to be press fit into the gap region 119. The spiral-shaped conduit 116 includes an input end 118 and an opposite end 131. An air input nozzle 121 is connected to the input end 118, and serves to inject air streams from the air source 12 (shown in FIG. 1) into the conduit 116. As described earlier, the conduit 116 is welded to the heat chamber 114 at the opposite end 131, allowing air from the air conduit 116 to enter the heat chamber 114. The heated air stream exits the chamber 114 from the air output nozzle, shown as being coupled to the outlet port of the chamber 114.

Figure 4B:
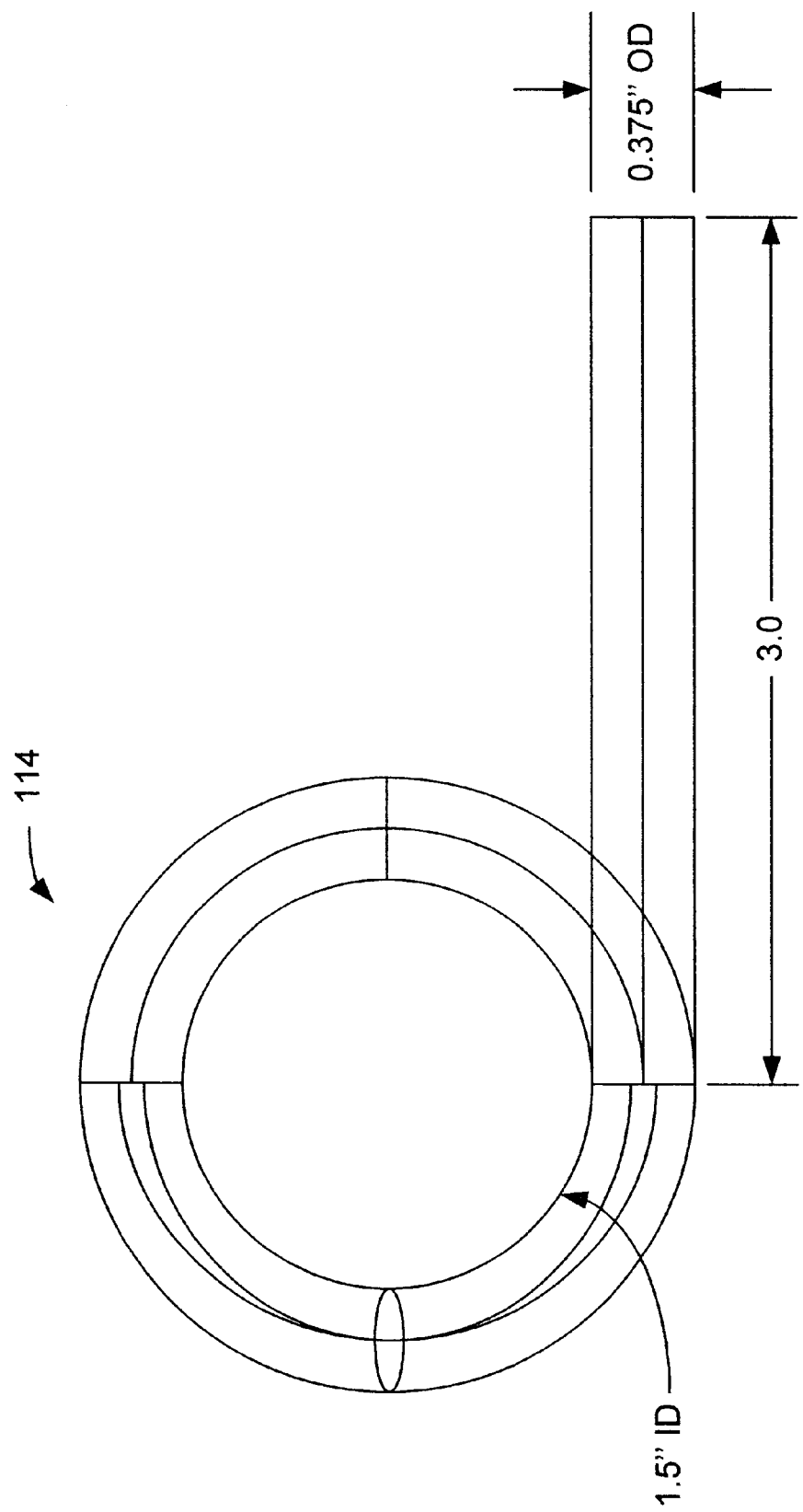
FIG. 4(b) provides a top view of the spiral-shaped conduit.

FIG. 4(b) illustrates the dimensions of the air conduit 116, as viewed from the top. In the illustrated embodiment, the outer spiral conduit 116 has an inner diameter of 1.5 inches. The difference between the inner diameter and the outer diameter of the spiral conduit 116 is about 0.375 inches, as shown. As described in reference to FIG. 3(b), the inner chamber 114 has an outer diameter of 1.125 inches. The thickness of the shell-shaped gap region 119 formed between the inner chamber and the outer spiral is thus given by:

$$(1.5-1.125)/2=0.1875 \text{ inches.}$$

FIGS. 5(a) and 5(b) illustrate a heater core 112, constructed in accordance with a preferred embodiment of the present invention. FIG. 5(a) provides a top view (not shown to scale) of the heater core 112, whereas FIG. 5(b) provides a side view (both views not shown to scale). In the illustrated preferred embodiment, the heater core 112 has a cylindrical, tubular configuration, and is made of quartz. The heater core 112 preferably has a wall thickness of about ⅙ inches, and an overall length of about 7 inches.

The inner and outer diameters of the heater core 112 are sized so as to fit into the gap region 119 described above. As described with reference to FIG. 4(b), the size of the gap region 119 between the chamber 114 and the conduit 116 is (1.5−1.125)/2=0.1875 inches=4.7625 mm. The total space which needs to be shared by the outer diameter and the inner diameter of the heater core 112 is therefore given by the difference between the size of the gap 119 and the maximum diameter of the quartz tube 300:

$$4.7625 \text{ mm} - 3 \text{ mm} = 1.7625 \text{ mm} = 0.035 \text{ inches.}$$

The maximum outer diameter of the heater core 112 is given by the difference between the inner diameter of the spiral-conduit 116 and one half of the space shared by the outer and inner diameter of the heater core 112, i.e.:

$$OD_{max} \text{ (heater core)} = 1.5 \text{ in} - 0.035 \text{ in} = 1.465 \text{ inches.}$$

The minimum inner diameter of the heater core 112 is given by the sum of the outer diameter of the inner chamber 114 and one half of the space shared by the outer and inner diameters of the heater core:

$$ID_{min} \text{ (heater core)} = 1.125 \text{ inner chamber } OD + 0.035 \text{ in} = 1.16 \text{ inches.}$$

The heater core 112 includes a heat generating element 113. In a preferred embodiment, the heat generating element 113 may be a conductive filament, such as a heater wire, which generates heat upon application of an electrical potential across the filament, although other embodiments of the invention may use other types of heat generating elements. The heater core 112 preferably operates at a maximum of 500 watts, at 120 Volts. The current through the heat generating element 113 is therefore 500/120=4.17 Amps.

The heater wire 113 should therefore has a resistance of about 120/4.17=28.8 Ohms. In the illustrated embodiment, a 22 gauge Kanthal A1 heater wire, having a length of about 21.5 feet and a diameter of 0.644, was used, although other embodiments of the invention may use other types of heater wires, such as Kanthal APM heater wire. The Kanthal A1 22 gauge wire has a resistance of 1.36 Ohms per foot.

The cylindrical heater core 112 has a first end 310 and a second end 311. A set of evenly spaced notches 320 are cut out at both ends 310 and 311 of the heater core 112. In the illustrated embodiment, each notch 320 is about 2 mm wide, and 4 mm deep. The Kanthal A1 22 gauge wire is wound inner diameter to outer diameter. The notches 320 are used to evenly space each wire space.

The 22 gauge Kanthal A1 heater wire 113 encircling the heater core 112 define conductive coils that surround the cylindrical shell structure. About 21 feet of heater wire 113 is used. The cylindrical heater core is preferably press fit into the gap 119 between the inner chamber 114 and the outer spiral conduit 116. Both ends of the heater wire 113 extend out to the back end of the heater 100. An outer case (not shown) may be. provided for the heater 100, preferably made of steel and having an outer diameter of about 4 inches, and a length of about 9 inches. The heater wires 113 terminate at ceramic terminals that electrically isolate them from the outer case.

The conductive coils that surround the heater core 112 radiate heat energy, when a voltage is applied across the coils. The heat energy is radiated both radially inward, toward the heat chamber 114, and radially outward, toward the outer spiral conduit 116. In particular, the conductive coils define a heat flow path for the heat energy in a first direction radially inward of the coils toward the heat chamber 114, and in a second direction radially outward of the coils toward the spiral-shaped conduit 116, substantially opposite the first direction. Because heat is radiated in both directions, heating takes place both in the heat chamber 114 and in the conduit 116, increasing the efficiency of the heating process.

Preferably, the heater core 112 should not have glass to glass contact, either with the inner chamber 114 or with the outer spiral conduit 116. It is thus desirable that there be an inner and outer spacing around the heater core 112. For this purpose, high temperature buffer material, for example ceramic tape, may be placed at the top and bottom inner diameter and outer diameter of the heater core 112, to provide insulation. The ceramic tape can be placed over the weld points, at the top and bottom on the inner diameter and the outer diameter of the heater core 112. The tape may also be wrapped around the outer diameter of the heater core 112, and around the ends of the outer spiral conduit 116.

Figure 6:
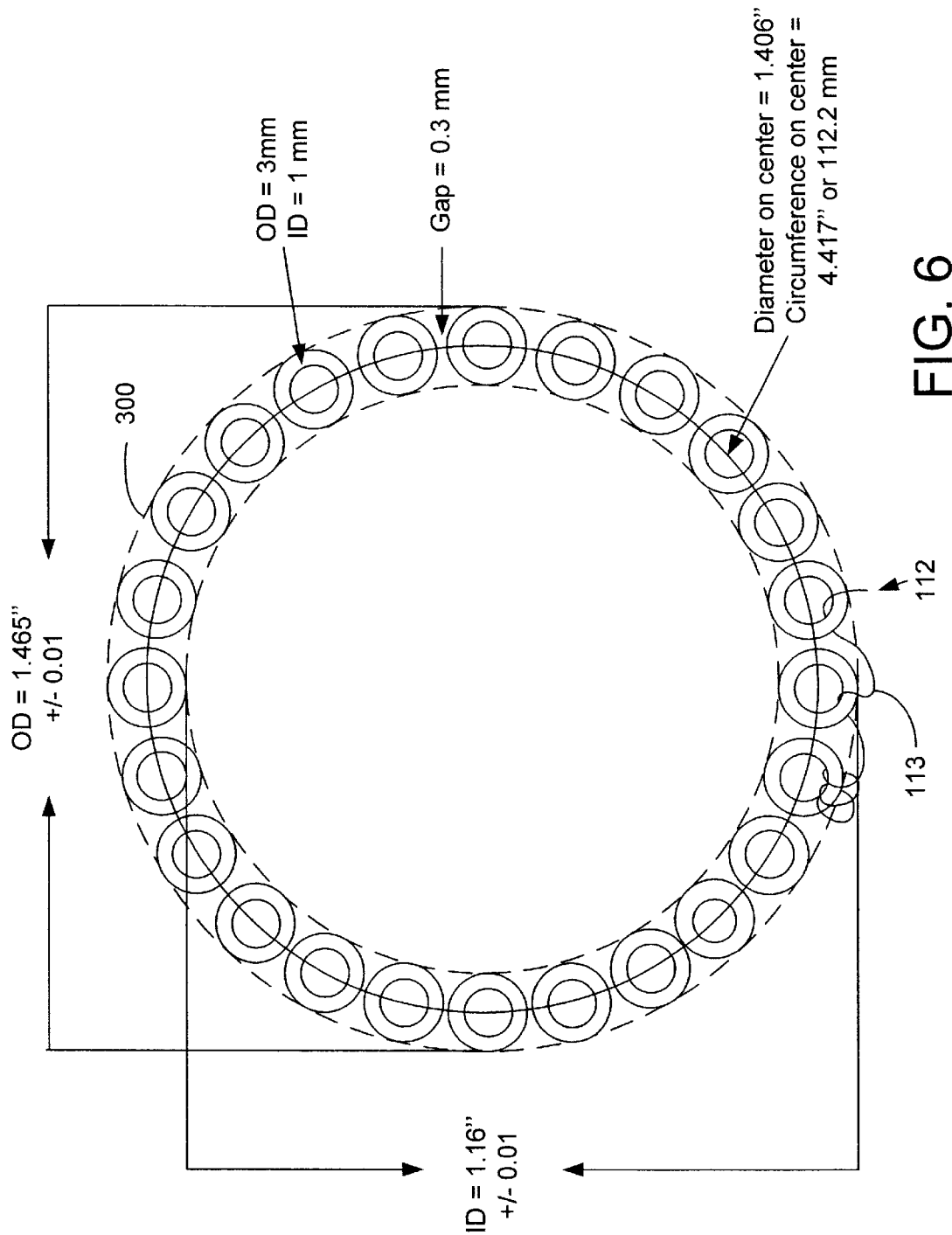
FIG. 6 provides a cross-sectional view of a heater core, constructed in accordance with another embodiment of the present invention.

FIG. 6 provides a cross-sectional view of another embodiment of the heater core 112. In this embodiment, the body of the heater core 112 is formed by welding together a plurality of quartz tubes 300, disposed side by side and spaced apart from each other in an annulus so as to form a cylindrical shell structure. In the illustrated exemplary embodiment of the invention, 34 quartz tubes, each having a length of about 7.5 inches, are welded together, 1 inch from both ends, to form a cylindrical shell structure. The tubes are spaced apart by about 0.3 mm, on average.

In the illustrated embodiment, the outer diameter of the quartz tubes 300 that are used to form the body of the heater core come in increments of 1 mm, i.e. the outer diameters of the tubes range may be 1 mm, 2 mm, 3 mm, or larger. Since there must be room for the buffer material on the inner diameter and the outer diameter of the heater core, however, the diameter of the quartz tube is preferably not larger than 3 mm. Since 34 tubes are used in the illustrated embodiment, each having a diameter of 3 mm, and with a 0.3 mm gap between each tube, the circumference of the cylindrical heater core 112, as measured along the center of the constituent quartz tubes, is about 112.2 mm.

In operation, the solenoid valve (shown in FIG. 1) is activated to generate a short burst of air, by releasing air pressure from the pressure vessel. The heater is activated by applying an electric potential through the heater wire 113, so that heat is generated by the wire. The burst of air is injected, using an air injection nozzle, into an input end of the outer spiral conduit 116 surrounding the heater core 112. The burst of air is rapidly heated as the air flows through the spiral conduit 116, and enters the heat chamber 114 which encloses the heat generated by the heater wire 113. The burst of air flows through the heat chamber 114, and exits from an outlet port of the heat chamber 114. An air outlet nozzle connected to the outlet port of the heat chamber 114 directs the heated burst of air at the outer coating of an optical fiber. The air outlet nozzle is preferably stationary, and relatively wide, so that heated air can be directed to the entire stripping length of the fiber, and no translation of the fiber or the heat source is required, nor is any motion of the nozzle required. The entire polymer coating on the outside of an optical fiber is vaporized and removed almost instantly.

In summary, the method and system of the present invention allows rapid and efficient stripping of optical fibers, without using chemicals. The virgin strength of the fiber is not degraded, since no mechanical scratching of the fiber occurs; and the fiber is not exposed to any oxidized metal particles, carbon, or other contamination from the heat source. The method and system of the present invention can be used on titanium dioxide color coded fiber without degrading the splice strength. Virtually no coating residue is left on the fiber, and no curling of the polymer coating is caused, so that no interference is caused with the next step in optical fiber processing, such as splicing. No rinse step is therefore required; after the fiber has been stripped.

While the invention has been particularly shown and described with reference to specific preferred embodiments, it should be understood by those skilled in the art that various changes in form and detail may be made therein without departing from the spirit and scope of the invention, as defined by the appended claims.

What is claimed is:

1. A system for stripping an optical fiber having an outer coating, the system including:
    a) an air source;
    b) means, in operative communication with said air source, for generating one or more air streams from said air source during a predetermined time interval; and
    c) a heater for heating said one or more air streams to a predetermined temperature sufficient to remove the outer coating from the optical fiber, the heater including:
        i) an isolated air stream transport path for receiving an air stream from said air source, said air stream transport path comprising a heat chamber and having a first end coupled to said air source and an outlet port;
        ii) a heater core including a heat generating element, said heat chamber disposed within said heater core and said heater core configured to allow heat from said heat generating element to be transferred to said air stream within said air stream transport path, wherein said air stream is substantially heated to said predetermined temperature and remains isolated from said heater core; and
        iii) an air output nozzle coupled to said outlet port and configured to direct said heated air stream onto said optical fiber to remove the outer coating from said optical fiber.

2. A system according to claim 1, wherein said predetermined temperature is from about 700 degrees C. to about 1100 degrees C.

3. A system according to claim 1, wherein said predetermined time interval is less than about 1 second.

4. A system according to claim 1, wherein said heater is made of quartz.

5. A system according to claim 1, wherein the means for generating one or more air streams comprises:
    a) a pressure pump for creating air pressure;
    b) an air pressure controller operatively coupled to the pressure pump for controlling the air pressure created by the pressure pump; and
    c) an air flow regulator, in communication with the air pressure controller, for regulating the flow of air out of said air source so as to controllably release the one or more air streams from said air source.

6. A system according to claim 1, further comprising an air injection nozzle connected to said air source for injecting one or more of said air streams into said first end of said air stream transport path.

7. A system according to claim 1, further comprising an air filter in communication with said means for generating one or more air streams, said air filter configured to filter contaminants from said air source.

8. A system according to claim 1, wherein said air stream transport path further includes a conduit and heat from said heat generating element is transferred to said air stream within said conduit.

9. A system according to claim 5, wherein said air flow regulator comprises a valve.

10. A system according to claim 9, further comprising a timer circuit for controlling the predetermined time interval.

11. A system for stripping an outer coating from an optical fiber, including:
    a) an air supply;
    b) a regulator for regulating the flow of air from said air supply, said regulator including means for periodically and controllably releasing bursts of air from said air supply during predetermined intervals of time; and
    c) a heater for healing said bursts of air to a predetermined temperature sufficient to remove the outer coating from the optical fiber, including:
        i) an isolated air transport path for receiving said bursts of air from said air supply, said air transport path comprising a heat transfer means and having a first end coupled to said air supply and an outlet port;
        ii) a heater core including a heat source, said heat transfer means disposed within said heater core and said heater core configured to transfer heat from said heat source to a burst of air within said air transport path, wherein said burst of air is substantially heated to said predetermined temperature and remains isolated from said heater core; and
        iii) an output nozzle coupled to said outlet port and configured to direct said heated burst of air onto said optical fiber to remove the outer coating from said optical fiber.

12. A system according to claim 11, further comprising an air filter in communication with said regulator for removing contaminants from said air supply.

13. A method for stripping an optical fiber having an outer coating, the method comprising:
  (a) generating air stream bursts from an air source;
  (b) providing a heater comprising:
    i) an isolated air stream transport path comprising a heat chamber and having a first end coupled to said air source and an outlet port; and
    ii) a heater core having a heat generating element, said heat chamber being disposed within said heater core;
  (c) heating said heat chamber by generating heat from said heat generating element of said heater core;
  (d) transporting one or more of said air stream bursts from said air source to said heat chamber;
  (e) heating one or more of said air stream bursts within said heat chamber to a predetermined temperature sufficient to remove said outer coating from said optical fiber, while isolating said one or more air stream bursts from said heater core; and
  (f) directing one or more of said air stream bursts onto the optical fiber so as to thermally remove the outer coating from said optical fiber.

14. A method according to claim 13, further comprising adding a desiccant to said air stream burst.

15. A method according to claim 13, wherein the step of generating said one or more air stream bursts comprises:
  (a) creating air pressure within the air source; and
  (b) regulating air pressure within the air source and the flow of air from the air source so that air is released from the air source in predetermined time intervals.

16. A method according to claim 13, wherein said predetermined temperature is between about 700 degrees to about 1100 degrees.

17. A method according to claim 13, wherein one or more of said air stream bursts have a duration of less than about 1 second.

* * * * *

UNITED STATES PATENT AND TRADEMARK OFFICE
CERTIFICATE OF CORRECTION

PATENT NO. : 6,402,856 B1
DATED : June 11, 2002
INVENTOR(S) : Carmine J. Vetrano It is certified that error appears in the above-identified patent and that said Letters Patent is hereby corrected as shown below:

Column 4,
Lines 54-55, replace "pressure switch 28" with -- pressure switch 21 --.
Line 55, replace "controller 24" with -- pump 22 --.

Column 5,
Line 2, replace "input port 34" with -- input port 17 --.

Signed and Sealed this

Seventh Day of January, 2003

JAMES E. ROGAN
*Director of the United States Patent and Trademark Office*

UNITED STATES PATENT AND TRADEMARK OFFICE
Certificate

Patent No. 6,402,856 B1                                           Patented: June 11, 2002

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Carmine J. Vetrano, Medford, MA; and Robert G. Wiley, Frankfurt, KY.

Signed and Sealed this Thirteenth Day of May 2003.

RANDY GULAKOWSKI
*Supervisory Patent Examiner*
Art Unit 1746